(12) United States Patent
Talarico et al.

(10) Patent No.: US 11,317,398 B2
(45) Date of Patent: *Apr. 26, 2022

(54) SEMI-PERSISTENT SCHEDULING FOR AUTONOMOUS TRANSMISSION ACTIVATION AND RELEASE

(71) Applicant: Apple Inc., Cupertino, CA (US)

(72) Inventors: Salvatore Talarico, Sunnyvale, CA (US); Qiaoyang Ye, Fremont, CA (US); Wenting Chang, Beijing (CN); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/995,693

(22) Filed: Aug. 17, 2020

(65) Prior Publication Data

US 2021/0037508 A1 Feb. 4, 2021

Related U.S. Application Data

(63) Continuation of application No. 16/476,038, filed as application No. PCT/US2018/014558 on Jan. 19, 2018, now Pat. No. 10,750,491.

(Continued)

(51) Int. Cl.
*H04W 72/04* (2009.01)
*H04W 72/12* (2009.01)

(52) U.S. Cl.
CPC ....... *H04W 72/042* (2013.01); *H04W 72/048* (2013.01); *H04W 72/1215* (2013.01)

(58) Field of Classification Search
CPC . H04W 72/04; H04W 72/042; H04W 72/048; H04W 72/1215
See application file for complete search history.

(56) References Cited

U.S. PATENT DOCUMENTS 9,521,666 B2 12/2016 Zhang et al.
10,182,436 B2 1/2019 Li et al.
(Continued)

FOREIGN PATENT DOCUMENTS

WO WO 2016070432 5/2016
WO WO 2016118241 7/2016
(Continued)

OTHER PUBLICATIONS

International Search Report and Written Opinion of the International Searching Authority directed to related International Patent Application No. PCT/US18/014558, dated Apr. 10, 2018.
(Continued)

*Primary Examiner* — Liton Miah
(74) *Attorney, Agent, or Firm* — Sterne, Kessler, Goldstein & Fox P.L.L.C.

(57) ABSTRACT

Described is an apparatus of a User Equipment (UE). The apparatus may comprise a first circuitry and a second circuitry. The first circuitry may be operable to process a first Downlink Control Information (DCI) format 0A transmission indicating a semi-persistent scheduling (SPS) activation. The first circuitry may also be operable to process a second DCI format 0A transmission indicating an SPS release. The second circuitry may be operable to generate one or more Uplink (UL) transmissions for an unlicensed spectrum of the wireless network after the SPS activation and before the SPS release in accordance with a configured schedule.

20 Claims, 7 Drawing Sheets

Related U.S. Application Data

(60) Provisional application No. 62/448,147, filed on Jan. 19, 2017.

(56) References Cited

U.S. PATENT DOCUMENTS

| | | | |
|---|---|---|---|
| 10,750,491 | B2 | 8/2020 | Talarico et al. |
| 10,750,532 | B2* | 8/2020 | Babaei ............... H04W 72/042 |
| 2011/0223924 | A1 | 9/2011 | Lohr et al. |
| 2013/0102320 | A1* | 4/2013 | Suzuki ............... H04W 72/042 |
| | | | 455/452.1 |
| 2014/0105164 | A1* | 4/2014 | Moulsley .......... H04W 72/1289 |
| | | | 370/329 |
| 2014/0112280 | A1* | 4/2014 | Lee ..................... H04W 72/04 |
| | | | 370/329 |
| 2016/0295561 | A1 | 10/2016 | Papasakellariou |
| 2017/0170931 | A1 | 6/2017 | Kusashima et al. |
| 2017/0290030 | A1* | 10/2017 | Wang ............... H04W 72/0413 |
| 2017/0295594 | A1* | 10/2017 | Ozturk ............... H04W 52/246 |
| 2017/0367058 | A1* | 12/2017 | Pelletier ............ H04W 52/246 |
| 2018/0019842 | A1 | 1/2018 | Fu et al. |
| 2018/0049229 | A1* | 2/2018 | Dinan ................. H04L 1/1896 |
| 2018/0131598 | A1 | 5/2018 | Suzuki et al. |
| 2018/0160445 | A1* | 6/2018 | Babaei ................. H04W 72/14 |
| 2018/0199334 | A1 | 7/2018 | Ying et al. |
| 2018/0242326 | A1* | 8/2018 | Aiba .................... H04W 72/14 |
| 2018/0309544 | A1* | 10/2018 | Hwang ................ H04L 1/1887 |
| 2019/0014564 | A1* | 1/2019 | Lee ..................... H04L 5/0042 |
| 2019/0021085 | A1* | 1/2019 | Mochizuki ............ H04W 48/16 |
| 2019/0045507 | A1* | 2/2019 | Sorrentino .......... H04W 72/042 |
| 2019/0349937 | A1 | 11/2019 | Kusashima et al. |
| 2020/0036586 | A1 | 1/2020 | Gao et al. |

FOREIGN PATENT DOCUMENTS

| | | |
|---|---|---|
| WO | WO 2016122391 | 8/2016 |
| WO | WO 2017147515 | 8/2017 |

OTHER PUBLICATIONS

International Preliminary Report on Patentability for related International Patent Application No. PCT/US18/014558, dated Aug. 1, 2019.

3GPP,"3GPP TS 36.212 V14.1.1", 3rd Generation Partnership Project; Technical specification Group Radio Access Network; Evolved Universal Terrestrial Radio Access (E-UTRA); Multiplexing and channel coding (Release 14), (2017).

3GPP, "3GPP TS36.213 v14.1.0", 3rd Generation Partnership Project; Technical Specification Group Radio Access Network; Evolved Universal Terrestrial Radio Access (E-UTRA); Physical Layer Procedures (Release 14) (2012).

Multefire Alliance, "Evolved Universal Terrestrial Radio Access (E-UTRA); MF physical layer; Multiplexing and channel coding (Release 1)", MFA TS 36.212 v1 .0.0; Technical Specification (2016).

* cited by examiner

… (1)

SEMI-PERSISTENT SCHEDULING FOR AUTONOMOUS TRANSMISSION ACTIVATION AND RELEASE

CLAIM OF PRIORITY

This application is a continuation of U.S. Non-Provisional application Ser. No. 16/476,038, filed Jul. 3, 2019, which is a National Stage Entry of and claims priority to, PCT Application No. PCT/US2018/014558, filed on Jan. 19, 2018 and titled "Semi-Persistent Scheduling For Autonomous Transmission Activation and Release," which claims priority under 35 U.S.C. § 119(e) to U.S. Provisional Patent Application 62/448,147 filed Jan. 19, 2017, all of which are herein incorporated by reference in their entireties.

BACKGROUND

A variety of wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system. Next-generation wireless cellular communication systems based upon LTE and LTE-A systems are being developed, such as a fifth generation (5G) wireless system/5G mobile networks system. Next-generation wireless cellular communication systems may provide support for higher bandwidths in part by using unlicensed spectrum

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
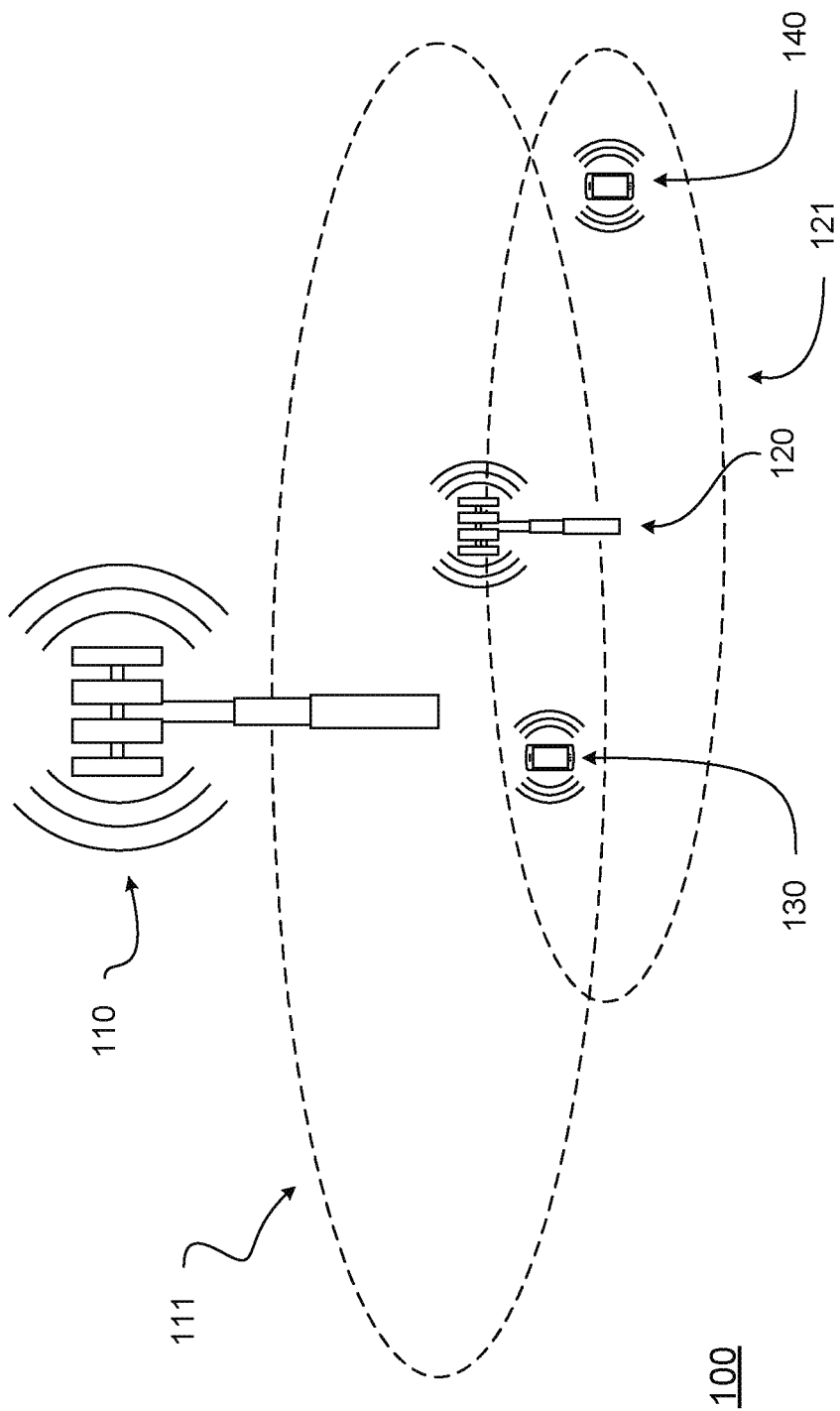
FIG. 1 illustrates a scenario of one or more Evolved Node Bs (eNBs) and one or more User Equipments (UEs), in accordance with some embodiments of the disclosure.

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced (LTE-A) system, and a 5th Generation (5G) wireless system/5G mobile networks system.

Due to the popularity of mobile devices and smart devices, the widespread adoption of wireless broadband has resulted in significant growth in the volume of mobile data traffic and has radically impacted system requirements, sometimes in divergent ways. For example, while it may be important to lower complexity, elongate battery life, and support highly mobility and service continuity of devices, it may also be important to increase data rates and bandwidths and lower latencies to support modern applications.

To meet the needs of future wireless networks, various physical layer techniques have been introduced (e.g, Multiple Input Multiple Output (MIMO) techniques, enhanced Inter-Cell Interference Coordination (ICIC) designs, coordinated multi-point designs, and so on). An increasing interest has also arisen in operating cellular networks in unlicensed spectrum to ameliorate the scarcity of licensed spectrum in low frequency bands, with the aim to further improve data rates. One enhancement for LTE in 3GPP Release 13 has been to enable operation in unlicensed spectrum via Licensed-Assisted Access (LAA), which may expand a system bandwidth by utilizing a flexible carrier aggregation (CA) framework introduced by the LTE-Advanced system. Enhanced operation of LTE systems in unlicensed spectrum is also expected in future releases, as well as in 5G systems.

Potential LTE operations in unlicensed spectrum may include (but not be limited to) LTE system operation in the unlicensed spectrum via Dual Connectivity (DC) (e.g., DC-based LAA). Potential LTE operations in unlicensed spectrum may also include LTE-based technology operating solely in unlicensed spectrum without relying upon an "anchor" in licensed spectrum, such as in MulteFire™ technology by MulteFire Alliance of Fremont Calif., USA. Standalone LTE operation in unlicensed spectrum may combine performance benefits of LTE technology with a relative simplicity of Wi-Fi®-like deployments. (Wi-Fi® is a registered trademark of the Wi-Fi Alliance of Austin, Tex., USA.) Standalone LTE operation may accordingly be an advantageous technology in meeting demands of ever-increasing wireless traffic.

An unlicensed-spectrum frequency band of current interest for 3GPP systems is the 5 gigahertz (GHz) band, which may present a wide spectrum with global common availability. The 5 GHz band in the US is governed by Unlicensed National Information Infrastructure (U-NII) rules of the Federal Communications Commission (FCC). The primary incumbent systems in the 5 GHz band may be Wireless Local Area Networks (WLAN) systems, specifically those based on IEEE 802.11 a/n/ac technologies. Since WLAN systems may be widely deployed both by individuals and operators for carrier-grade access service and data offloading, sufficient care should be taken before deployment of coexisting 3GPP systems.

Accordingly, Listen-Before-Talk (LBT) may be a feature of Release 13 LAA systems to promote fair coexistence with incumbent systems. In an LBT procedure, a radio transmitter may first sense a medium and may transmit if the medium is sensed to be idle.

Meanwhile, in scheduled-based Uplink (UL) designs, UL Physical Uplink Shared Channel (PUSCH) transmission may be determined based on explicit UL grant transmission via Physical Downlink Control Channel (PDCCH) (e.g., via Downlink Control Information (DCI) format 0). UL grant transmission may be performed after completing an LBT procedure at an Evolved Node-B (eNB). After receiving an UL grant, a scheduled User Equipment (UE) may perform a short LBT or Category 4 (Cat 4) LBT during an allocated time interval. If the LBT is successful at the scheduled UE, then UE may transmit PUSCH on resources indicated by the UL grant.

Due to the double LBT requirement at both eNB (when sending the UL grant) and at the scheduled UEs (before UL transmission), UL performance in unlicensed spectrum may be significantly degraded by UL starvation. This is a general problem when a scheduled system (such as LTE) coexists with a non-scheduled autonomous system (such as Wi-Fi®).

Accordingly, in various embodiments, autonomous UL (AUL) transmission (which may also be termed General UL (GUL) transmission) may be employed to improve the performance of UL transmission. AUL may be activated, released, and configured in a variety of manners.

In a first type of embodiment, a Radio Resource Control (RRC) protocol may be used. This protocol may support the transfer of both common Non-Access Stratum (NAS) information and dedicated NAS information related to specific UEs. RRC connection establishment may include the establishment of a Signaling Radio Bearer 1 (SRB1) and the transfer of an initial uplink NAS message. This NAS message may trigger an establishment of an Si connection, which may then initiate a subsequent step during which an Evolved Universal Mobile Telecommunications Systems Terrestrial Radio Access Network (E-UTRAN) may activate Access Stratum (AS) security, and/or may establish a Signaling Radio Bearer 2 (SRB2) and one or more Data Radio Bearers (DRBs). This entire procedure may take 16 or more milliseconds (ms). RRC connection release may be initiated by an eNB following release of an Si connection between the eNB and a Core Network (CN).

In a second type of embodiment, a semi-persistent scheduling (SPS) scheme may be adopted. The periodicity of a semi-persistent scheduled transmission may be configured by RRC signaling in advance, while activation may be done using PDCCH and/or enhanced PDCCH (ePDCCH) using a semi-persistent Cell Radio Network Temporary Identifier (C-RNTI). After enabling SPS, a terminal may continue to monitor PDCCH and/or ePDCCH for DL scheduling commands. When a dynamic scheduling command is detected, it may take precedence over SPS in that particular subframe, which may be useful if semi-persistently allocated resources occasionally need to be increased.

The first type of embodiment and the second type of embodiment may both be feasible, although each type of embodiment may have its advantages and disadvantages. While RRC-based embodiments may be simpler and may not incorporate various changes to support an AUL activation and release procedure, RRC protocols may need more time for activation and release compared to SPS, and may induce higher latencies. This may be due to SPS being primarily affected by typical Hybrid Automatic Repeat Request (HARQ) Acknowledgement (ACK) delays, which may be shorter than typical RRC procedure delays.

However, legacy SPS activation and release mechanisms may not be suitable for signaling AUL activation and release. Legacy SPS mechanisms may be based on the use of DCI format 0, which may have a format in accordance with Table 1 below. (In Table 1, N may be a number of resource blocks scheduled for UL.)

TABLE 1

| DCI format 0 | |
| --- | --- |
| Field | Length in Bits |
| Carrier indicator | 3 |
| Format for format 0/format 1A (e.g., format flag (FF)) | 1 |
| Frequency hopping (FH) flag | Log2[N(N + 1)/2] |
| Modulation and coding scheme and redundancy version | 5 |
| New data indicator | 1 |
| TPC command | 2 |
| Cyclic shift for DM-RS and OCC index (CS/OCC) | 3 |
| UL index | 2 |
| Downlink assignment index (DAI) | 2 |
| CSI request | 1, 2, or 3 |
| SRS request | 0 or 1 |
| Resource allocation type | 1 |

In accordance with legacy SPS activation and release mechanisms, some of the fields of DCI format 0 may be set to some specific values in order to signal AUL activation and/or AUL release. In particular, signaling of AUL activation may employ settings provided in Table 2 below (related to DCI format 0 for SPS activation PDCCH/ePDCCH validation), while signaling of AUL release may employ settings provided in Table 3 below (related to DCI format 0 for SPS release PDCCH/ePDCCH validation).

TABLE 2

| DCI format 0 fields for SPS activation | |
| --- | --- |
| Field | Setting for DCI format 0 |
| TPC command | Set to '00' |
| Cyclic shift for DM-RS and OCC index (CS/OCC) | Set to '000' |
| Modulation and coding scheme and redundancy version | MSB is set to '0' |
| HARQ process number | N/A |
| Modulation and coding scheme | N/A |
| Redundancy version | N/A |

TABLE 3

| DCI format 0 fields for SPS release | |
| --- | --- |
| Field | Setting for DCI format 0 |
| TPC command | Set to '00' |
| Cyclic shift for DM-RS and OCC index (CS/OCC) | Set to '000' |
| Modulation and coding scheme (MCS) and redundancy version | Set to '11111' |
| Resource block assignment and hopping resource allocation | Set to all '1's |
| HARQ process number | N/A |
| Modulation and coding scheme | N/A |
| Redundancy version | N/A |
| Resource block assignment | N/A |

Unfortunately, DCI format 0 may not be supported in enhanced LAA (eLAA) and/or MulteFire™. Instead, DCI format 0A, DCI format 0B, DCI format 4A, and/or DCI format 4B may be used, which may have fields as summarized in Table 4 below (in which "S" may indicate a number of scheduled subframes). While these DCIs may carry fields similar to format DCI 0, and may serve as replacements, they might not support PDCCH and/or ePDCCH SPS activation and SPS release functionalities.

TABLE 4

DCI format 0A/0B/4A/4B fields

| Fields | DCI format 0A (bits) | DCI format 0B (bits) | DCI format 4A (bits) | DCI format 4B (bits) |
|---|---|---|---|---|
| Carrier indicator | 0 or 3 | 0 or 3 | 0 or 3 | 0 or 3 |
| Format 0/1A format | 1 | — | — | — |
| PUSCH or MulteFire ™ ePUCCH enhanced Physical Uplink Control Channel (ePUCCH) trigger A | 1 | 1 | 1 | 1 |
| Timing offset | 4 | 4 | 4 | 4 |
| Resource block assignment | 4 or 6 | 4 or 6 | 4 or 6 | 4 or 6 |
| Modulation and coding scheme | 5 | 5 | 10 | 10 |
| HARQ ID | 4 | 4 | 4 | 4 |
| New Data Indicator | 1 | S | 2 | 2S |
| Redundancy version | 2 | S | 2 | S |
| TPC command | 2 | 2 | 2 | 2 |
| Cyclic shift for DM-RS and OCC index | 3 | 3 | 3 | 3 |
| CSI request | 1, 2, or 3 | 1, 2, or 3 | 1, 2, or 3 | 1, 2, or 3 |
| HARQ-ACK request | 1 | 1 | 1 | 1 |
| SRS request | 1 | 2 | 2 | 2 |
| PUSCH or MulteFire ™ ePUCCH starting position | 2 | 2 | 2 | 2 |
| PUSCH or MulteFire ™ ePUCCH ending symbol | 1 | 1 | 1 | 1 |
| Channel access type | 1 | 1 | 1 | 1 |
| Channel access priority class | 2 | 2 | 2 | 2 |
| Number of scheduled subframes | — | 1 or 2 | — | 1 or 2 |

Discussed herein are various embodiments for AUL activation and/or AUL release which may employ an SPS approach (which may be referred to for purposes of this application as SPS AUL activation and/or SPS AUL release, and/or as SPS activation and/or SPS release). Some embodiments may employ a "clean slate" solution with a design of a new DCI format dedicated to this functionality. Some embodiments may employ reuse of and/or extension of DCI format 0 scheduling of PUSCH with support for SPS. Some embodiments may employ reuse of DCI format 0A, DCI format 4A, DCI format 0B, and/or DCI format 4B for the scheduling of PUSCH. Some embodiments may use a number N of bits in a common PDCCH (cPDCCH) reserved for these functionalities. Some embodiments may employ UE-group-specific or cell-specific DCI. Some embodiments may employ cell-specific SPS RRC.

In addition, in various embodiments, DCI may include additional information and/or indicators related to one or more resources where AUL may be performed, and additional information and/or indicators related to one or more resources that may be used for AUL to configure activation and/or release.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

FIG. 1 illustrates a scenario of one or more eNBs and one or more UEs, in accordance with some embodiments of the disclosure. A scenario 100 may comprise a first eNB 110 serving a first cell 111 and a second eNB 120 serving a second cell 121. A first UE 130 may be positioned with respect to first cell 111 and second cell 121 in such a way as to permit wireless communication with both first eNB 110 and second eNB 120, whereas a second UE 140 may be positioned with respect to first cell 111 and second cell 121 in such a way as to permit wireless communication merely with second eNB 120.

First eNB 110 may support both DC-based LAA in unlicensed spectrum and standalone access in unlicensed spectrum, while second eNB 120 may merely support standalone access in unlicensed spectrum. Accordingly, first UE 130 may employ either DC-based LAA in unlicensed spectrum or standalone access in unlicensed spectrum, while second UE 140 may employ standalone access in unlicensed spectrum. Either first UE 130 or second UE 140 may employ an SPS approach for AUL activation and/or AUL release.

Embodiments falling within a first type may employ a "clean slate" solution with a design of a new DCI format dedicated to this functionality. To support AUL activation and/or AUL release, a new DCI format may be defined, which may be scrambled via SPS C-RNTI or via a newly-defined RNTI (for example, via an Autonomous Uplink Cell Radio Network Temporary Identifier (AUL-C-RNTI)) which may use reserved RNTI values. The DCI may have structure including one or more of the fields in Table 5 below.

TABLE 5

New DCI format

| Field | Length in bits |
|---|---|
| Carrier indicator | 3 |
| Format flag (FF) | 1 |
| Resource block assignment (RBA) | 4 or 6 |
| Modulation and coding scheme (MCS) | 5 |
| TPC command | 2 |
| Cyclic shift (CS) for DM-RS and Orthogonal Cover Code (OCC) index (CS/OCC) | 3 |
| AUL activation/release | 1 |

In some embodiments, the FF field may not be needed if a size of the DCI is different from an existing DCI. For some embodiments, the RBA field may not be needed if AUL uses the whole system bandwidth. In some embodiments, the MCS field may not be needed if an MCS of AUL may be determined autonomously and/or the AUL activation and AUL release does not rely on this field. For some embodiments, the TPC command may not be needed if the UE configured with AUL performs power control autonomously (e.g., based on downlink RSRP) and/or the AUL activation and AUL release does not rely on this field. In some embodiments, the CS/OCC field may not be needed, if AUL selects CS/OCC autonomously or CS/OCC are predefined and/or the AUL activation and AUL release does not rely on this field.

For some embodiments, AUL activation and/or AUL release may not be needed if the AUL activation and/or AUL release is not indicated explicitly. In some embodiments, criteria in accordance with Table 6 and Table 7 below may be used. Table 6 below may indicate settings for signaling AUL activation via one or more fields. Table 7 below may indicate settings for signaling AUL release via one or more fields.

TABLE 6

Settings to signal AUL activation

| Field | Setting |
|---|---|
| TPC command | Set to '00' |
| Cyclic shift for DM-RS and OCC index (CS/OCC) | Set to '000' |
| Modulation and coding scheme (MCS) | MSB is set to '0' |

TABLE 7

Settings to signal AUL release

| Field | Setting |
|---|---|
| TPC command | Set to '00' |
| Cyclic shift for DM-RS and OCC index (CS/OCC) | Set to '000' |
| Modulation and coding scheme (MCS) | Set to '11111' |

Note that the settings in Table 6 and Table 7 are exemplary, and that other codings may be used in other embodiments (e.g., other default values for the fields provided above may be used for signaling AUL activation and/or AUL release).

Embodiments falling within a second type may employ reuse and/or extension of DCI format 0 for the scheduling of PUSCH with support for SPS. In various LTE embodiments, DCI format 0 may be used for the scheduling of PUSCH in one UL cell (and may have the structure provided in Table 1). In some LTE embodiments, in order to activate an SPS assignment, a first set of settings may be used (e.g., the settings summarized in Table 2), while in order to deactivate an SPS assignment, a second set of settings may be used (e.g., the settings summarized in Table 3).

In the context of providing support for AUL activation and/or AUL release, a DCI format 0 may be reused (e.g., as summarized in Table 1). In such embodiments, while the settings in Table 2 and Table 3 may be set to signal AUL activation and/or AUL release, the remaining fields may all be set to some default value (e.g., a value of "0"). An RNTI used for this DCI may be SPS C-RNTI, or may be a newly defined RNTI, for instance an AUL-C-RNTI, which may use reserved RNTI values. In another embodiment, since a DCI format 0 may be also used for G-DCI to carry HARQ ACK/Non-Acknowledgement (NACK), one or more bits of fields which are not used for AUL activation and/or AUL release might be used to distinguish between these two cases.

Embodiments falling within a third type may employ reuse of DCI format 0A, DCI format 4A, DCI format 0B, and/or DCI format 4B for the scheduling of PUSCH. DCI format 0A, DCI format 0B, DCI format 4A, and/or DCI format 4B may be used for scheduling PUSCH (e.g., for MulteFire™ and/or for MulteFire™ enhanced Physical Uplink Control Channel (ePUCCH) in a MulteFire™). DCI format 0A and/or DCI format 0B may be used for scheduling of PUSCH (or MulteFire™ ePUCCH) for multiple subframes, while DCI format 4A and/or DCI format 4B may be used with multi-antenna port transmission mode. These DCI may be structured as described in Table 4. In the context of AUL activation and AUL release, DCI format 0A, DCI format 4A, DCI format 0B, and/or DCI format 4B may be reused, for example depending on a multi-antenna port transmission mode and/or a number of scheduled subframes. This may be done by scrambling the DCI via SPS C-RNTI or via a newly defined RNTI, such as via an AUL-C-RNTI, which may use reserved RNTI values.

When one of these DCI is used for AUL activation and/or AUL release, one or more of its fields may be set in various ways. In some embodiments, for SPS activation, all fields may be set to a default value (e.g., to values of all "0", or alternatively another set of values). In some embodiments, for SPS release, one or more fields may be set differently from the above setting. For instance, the coding used in Table 3 may be adopted by setting MCS to a value of "11111", or alternatively one or more other fields (e.g., an CS/OCC field) may be also set to values of all "1".

Accordingly, in various exemplary embodiments, merely a subset of the fields in the DCI format 0A, DCI format 0B, DCI format 4A, and/or DCI format 4B may be used for AUL activation and/or AUL release validation. These fields may be set to some default values, while other fields may be used for indication of AUL transmission. For example, resource block assignment may not be used for resource indication if AUL does not use the whole system bandwidth, or CS/OCC may be used to indicate a cyclic shift for Demodulation Reference Signal (DM-RS) and an OCC index, if the UE determines it autonomously, or if CS/OCC is predefined. In some embodiments, DCI format 0A may be adopted for G-DCI to carry HARQ ACK/NACK, one or more bits from fields which might not be directly utilized for AUL activation and AUL release might be used to distinguish between these two cases. In some embodiments, some of the fields may be used and dedicated for AUL activation and AUL release, while other fields could be dedicated to carry HARQ ACK/NACK.

Embodiments falling within a fourth type may use a number N of bits in a cPDCCH reserved for these functionalities. In some embodiments, N bits may be used in a cPDCCH, which may serve as a flag and may indicate whether AUL needs to be activated or released. For example, a flag may be assigned a first value (e.g., a value of "0") to activate AUL, and the flag may be assigned a second value (e.g., a value of "1") to release AUL (although in some alternate embodiments, the first value may be "1" and the second value may be "0"). For some embodiments, N may be 1, and this may be used to activate AUL or release AUL for one or more UEs configured with AUL (e.g., all UEs). Alternatively, for some embodiments, N may be more than 1, to activate or release AUL for a subset of UEs configured with AUL. For example, for N equal to 2, the bits of a two-bit bitmap may be used to activate/release AUL for two respectively corresponding groups of UEs configured with AUL.

The N bits may reuse reserved bits in an existing cPDCCH (and thus the cPDCCH may be the same size as a current cPDCCH). Alternatively, a cPDCCH size may be extended to a larger value with an additional N bits used for the AUL activation and/or AUL release. In some embodiments, a new cPDCCH may be defined to include the information needed for AUL activation and/or AUL release. For some embodiments, the cPDCCH may be scrambled by a current C-RNTI, or a newly defined RNTI can be used. In some embodiments, UEs that are not configured with AUL might not interpret these N bits, and/or might not decode the cPDCCH differently from an existing cPDCCH.

Embodiments falling within a fifth type may employ UE-group-specific or cell-specific DCI. For embodiments falling within the first type, the second type, and/or the third type above, a search space (SS) may be either UE-specific (which may be similar to SPS activation and/or SPS release), or may be UE-group specific in order to reduce overhead and a likelihood of collision between UEs configured with AUL.

Both for embodiments falling with the fourth type with multiple groups of UEs, and for embodiments falling within the fifth type, a UE group may be semi-statically configured (e.g., via RRC), or may be dynamically configured (e.g., depending on one or more current buffer statuses of each UE). In this context, there may be several ways to define a group or to select UEs. In some embodiments, a UE may be in AUL based on a buffer status report (BSR). For some embodiments, a UE may be in AUL based on location. In some embodiments, a UE may be in AUL based on the Channel State Information (CSI) at the eNB. For some embodiments, a UE may be in AUL based on a random selection among a pool of UEs.

In some embodiments, a UE grouping rule may re-use a rule of Transmit Power Control (TPC) configuration as DCI format 3 and/or DCI format 3A, where each bit in a bitmap may corresponds to activation and/or release of one specific user (e.g., UE).

For embodiments falling within the first type through the fifth type above, the DCI may include additional information related to the resources where AUL may be performed. For example, a number M of bits may be carried in DCI to indicate an offset after which AUL may be activated.

For embodiments falling within the first type through the fifth type above, DCI may include additional information to configure one or more BSR thresholds. In such embodiments, UEs with BSR larger than a BSR threshold may activate AUL transmission, while UEs with BSR smaller than the BSR threshold may wait for an eNB's scheduling. For various embodiments, an eNB may either explicitly configure the BSR threshold via DCI, or may transmit the BSR threshold in RRC signaling and configure an associated bit in DCI. For example, four BSR thresholds may be configured in RRC, where a value of "00" in DCI may correspond with a first BSR threshold, a value of "01" in DCI may correspond with a second BSR threshold, and so on. In various embodiments, different traffic types may have different BSRs (e.g., different BSR thresholds), and an eNB may configure separate BSR (e.g., different BSR thresholds) for different traffic types.

Embodiments falling within a sixth type may employ cell-specific SPS RRC. Instead of using one or more Media Access Control (MAC) Control Elements (CEs) to acknowledge the reception of the DCI for SPS activation, no UE-specific MAC UE feedback might be reported. However, one or more UE-specific parameters may be indicated in a UE-specific activation and/or release DCI, and ACK/NACK for the DCI related to AUL release may be carried on the Uplink Control Information (UCI).

Various embodiments may also fall within one or more of the types discussed herein.

Figure 2:
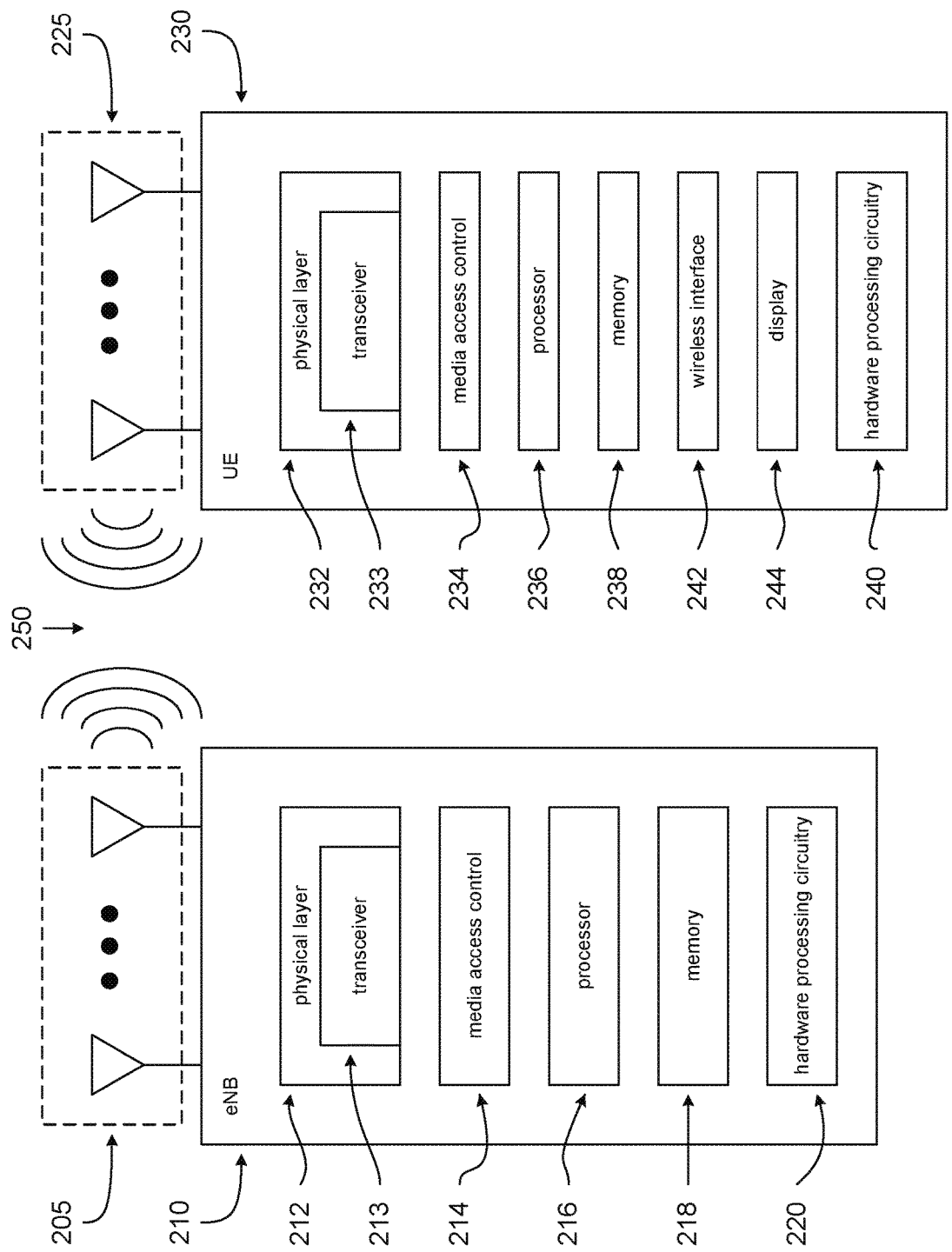
FIG. 2 illustrates an eNB and a UE, in accordance with some embodiments of the disclosure.

FIG. 2 illustrates an eNB and a UE, in accordance with some embodiments of the disclosure. FIG. 2 includes block diagrams of an eNB 210 and a UE 230 which are operable to co-exist with each other and other elements of an LTE network. High-level, simplified architectures of eNB 210 and UE 230 are described so as not to obscure the embodiments. It should be noted that in some embodiments, eNB 210 may be a stationary non-mobile device.

eNB 210 is coupled to one or more antennas 205, and UE 230 is similarly coupled to one or more antennas 225. However, in some embodiments, eNB 210 may incorporate or comprise antennas 205, and UE 230 in various embodiments may incorporate or comprise antennas 225.

In some embodiments, antennas 205 and/or antennas 225 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 205 are separated to take advantage of spatial diversity.

eNB 210 and UE 230 are operable to communicate with each other on a network, such as a wireless network. eNB 210 and UE 230 may be in communication with each other over a wireless communication channel 250, which has both a downlink path from eNB 210 to UE 230 and an uplink path from UE 230 to eNB 210.

As illustrated in FIG. 2, in some embodiments, eNB 210 may include a physical layer circuitry 212, a MAC (media access control) circuitry 214, a processor 216, a memory 218, and a hardware processing circuitry 220. A person skilled in the art will appreciate that other components not shown may be used in addition to the components shown to form a complete eNB.

In some embodiments, physical layer circuitry 212 includes a transceiver 213 for providing signals to and from UE 230. Transceiver 213 provides signals to and from UEs or other devices using one or more antennas 205. In some embodiments, MAC circuitry 214 controls access to the wireless medium. Memory 218 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 220 may comprise logic devices or circuitry to perform various operations. In some embodiments, processor 216 and memory 218 are arranged to perform the operations of hardware processing circuitry 220, such as operations described herein with reference to logic devices and circuitry within eNB 210 and/or hardware processing circuitry 220.

Accordingly, in some embodiments, eNB 210 may be a device comprising an application processor, a memory, one or more antenna ports, and an interface for allowing the application processor to communicate with another device.

As is also illustrated in FIG. 2, in some embodiments, UE 230 may include a physical layer circuitry 232, a MAC circuitry 234, a processor 236, a memory 238, a hardware processing circuitry 240, a wireless interface 242, and a display 244. A person skilled in the art would appreciate that other components not shown may be used in addition to the components shown to form a complete UE.

In some embodiments, physical layer circuitry 232 includes a transceiver 233 for providing signals to and from eNB 210 (as well as other eNBs). Transceiver 233 provides signals to and from eNBs or other devices using one or more antennas 225. In some embodiments, MAC circuitry 234 controls access to the wireless medium. Memory 238 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 242 may be arranged to allow the processor to communicate with another device. Display 244 may provide a visual and/or tactile display for a user to interact with UE 230, such as a touch-screen display. Hardware processing circuitry 240 may comprise logic devices or circuitry to perform various operations. In some embodiments, processor 236 and memory 238 may be arranged to perform the operations of hardware processing circuitry 240, such as operations described herein with reference to logic devices and circuitry within UE 230 and/or hardware processing circuitry 240.

Accordingly, in some embodiments, UE 230 may be a device comprising an application processor, a memory, one or more antennas, a wireless interface for allowing the application processor to communicate with another device, and a touch-screen display.

Elements of FIG. 2, and elements of other figures having the same names or reference numbers, can operate or function in the manner described herein with respect to any such figures (although the operation and function of such elements is not limited to such descriptions). For example, FIGS. 3 and 6-7 also depict embodiments of eNBs, hardware processing circuitry of eNBs, UEs, and/or hardware processing circuitry of UEs, and the embodiments described with respect to FIG. 2 and FIGS. 3 and 6-7 can operate or function in the manner described herein with respect to any of the figures.

In addition, although eNB 210 and UE 230 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 3:
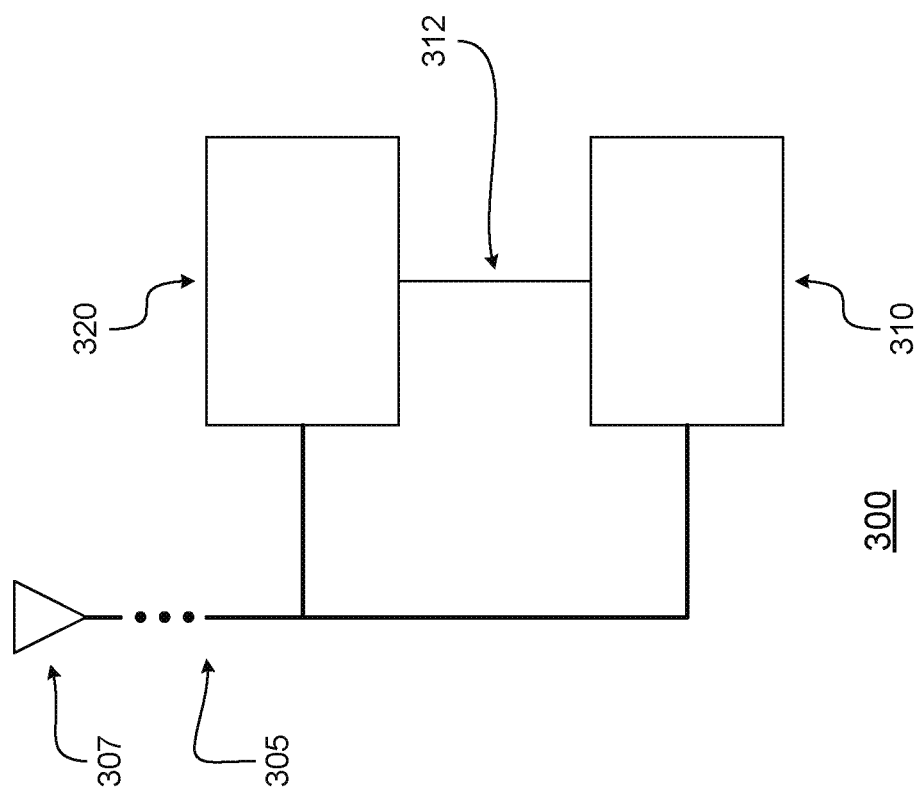
FIG. 3 illustrates hardware processing circuitries for a UE for SPS activation and/or SPS release, in accordance with some embodiments of the disclosure.

FIG. 3 illustrates hardware processing circuitries for a UE for SPS activation and/or SPS release, in accordance with some embodiments of the disclosure. With reference to FIG. 2, a UE may include various hardware processing circuitries discussed herein (such as hardware processing circuitry 300 of FIG. 3), which may in turn comprise logic devices and/or circuitry operable to perform various operations. For example, in FIG. 2, UE 230 (or various elements or components therein, such as hardware processing circuitry 240, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 236 (and/or one or more other processors which UE 230 may comprise), memory 238, and/or other elements or components of UE 230 (which may include hardware processing circuitry 240) may be arranged to perform the operations of these hardware processing circuitries, such as operations described herein with reference to devices and circuitry within these hardware processing circuitries. In some embodiments, processor 236 (and/or one or more other processors which UE 230 may comprise) may be a baseband processor.

Returning to FIG. 3, an apparatus of UE 230 (or another UE or mobile handset), which may be operable to communicate with one or more eNBs on a wireless network, may comprise hardware processing circuitry 300. In some embodiments, hardware processing circuitry 300 may comprise one or more antenna ports 305 operable to provide various transmissions over a wireless communication channel (such as wireless communication channel 250). Antenna ports 305 may be coupled to one or more antennas 307 (which may be antennas 225). In some embodiments, hardware processing circuitry 300 may incorporate antennas 307, while in other embodiments, hardware processing circuitry 300 may merely be coupled to antennas 307.

Antenna ports 305 and antennas 307 may be operable to provide signals from a UE to a wireless communications channel and/or an eNB, and may be operable to provide signals from an eNB and/or a wireless communications channel to a UE. For example, antenna ports 305 and antennas 307 may be operable to provide transmissions from UE 230 to wireless communication channel 250 (and from there to eNB 210, or to another eNB). Similarly, antennas 307 and antenna ports 305 may be operable to provide transmissions from a wireless communication channel 250 (and beyond that, from eNB 210, or another eNB) to UE 230.

Hardware processing circuitry 300 may comprise various circuitries operable in accordance with the various embodiments discussed herein. With reference to FIG. 3, hardware processing circuitry 300 may comprise a first circuitry 310 and/or a second circuitry 320.

In a variety of embodiments, first circuitry 310 may be operable to process a first DCI format 0A transmission indicating an SPS activation. First circuitry 310 may also be operable to process a second DCI format 0A transmission indicating an SPS release. Second circuitry 320 may be operable to generate one or more UL transmissions for an unlicensed spectrum of the wireless network after the SPS activation and before the SPS release in accordance with a configured schedule. First circuitry 310 may be operable to provide an indicator of SPS activation and/or SPS release to second circuitry 320 via an interface 312. Hardware processing circuitry 300 may also comprise an interface for sending UL transmissions to a transmission circuitry and for receiving DCI format 0A transmissions from a receiving circuitry.

In a variety of embodiments, at least one of the first DCI format 0A transmission and the second DCI format 0A transmission may carry a UE-specific parameter. For some embodiments, at least one of the first DCI format 0A transmission and the second DCI format 0A transmission may be scrambled with an AUL-C-RNTI. In some embodiments, the one or more UL transmissions may comprise at least one of: one or more PUSCH transmissions, or one or more Physical Uplink Control Channel (PUCCH) transmissions (e.g., ePUCCH transmissions).

For some embodiments, first circuitry 310 may be operable to process a transmission carrying the configured schedule. In some embodiments, the transmission carrying the configured schedule may be a PDCCH transmission.

For some embodiments, SPS activation may be indicated by one or more fields of the first DCI format 0A transmission having a first set of values, and SPS release may be indicated by one or more fields of the second DCI format 0A transmission having a second set of values. In some embodiments, SPS activation may be indicated by all bits of the one or more fields of the first DCI format 0A transmission being set to a first value, and SPS release may be indicated by all bits of the one or more fields of the second DCI format 0A transmission being set to a second value.

For some embodiments, at least one of the first DCI format 0A transmission and the second DCI format 0A transmission may carry at least one of: a one-bit FF field; a two-bit TPC command field; and a five-bit MCS field. In some embodiments, the first DCI format 0A transmission may carry a two-bit TPC command field having a value of "00" and/or a five-bit MCS field with a most significant bit having a value of "0". For some embodiments, the second DCI format 0A transmission may carry a two-bit TPC command field having a value of "00" and/or a five-bit MCS field having a value of "11111".

In a variety of embodiments, first circuitry 310 may be operable to process a first DL transmission scrambled with an AUL-C-RNTI, the first DL transmission indicating a SPS activation. First circuitry 310 may also be operable to process a second DL transmission scrambled with the AUL-C-RNTI, the second DL transmission indicating an SPS release. Second circuitry 320 may be operable to generate one or more UL transmissions for an unlicensed spectrum of the wireless network after the SPS activation and before the SPS release in accordance with a configured schedule. First circuitry 310 may be operable to provide an indicator of SPS activation and/or SPS release to second circuitry 320 via an interface 312. Hardware processing circuitry 300 may also comprise an interface for sending UL transmissions to a transmission circuitry and for receiving DL transmissions from a receiving circuitry.

In a variety of embodiments, at least one of the first DL transmission and the second DL transmission may carry a UE-specific parameter. For some embodiments, the one or more UL transmissions may comprise at least one of: one or more PUSCH transmissions, or one or more PUCCH transmissions (e.g., ePUCCH transmissions).

For some embodiments, first circuitry 310 may be operable to process a DL transmission carrying the configured schedule. In some embodiments, the DL transmission may carry the configured schedule is a PDCCH transmission.

For some embodiments, the first DL transmission is a first DCI format 0A transmission, and the second DL transmission is a second DCI format 0A transmission. In some embodiments, SPS activation may be indicated by one or more fields of the first DCI format 0A transmission having a first set of values, and SPS release may be indicated by one or more fields of the second DCI format 0A transmission having a second set of values. For some embodiments, SPS activation may be indicated by all bits of one or more fields of the first DCI format 0A transmission being set to a first value, and SPS release may be indicated by all bits of one or more fields of the second DCI format 0A transmission being set to a second value.

In some embodiments, first circuitry 310 and/or second circuitry 320 may be implemented as separate circuitries. In other embodiments, first circuitry 310 and/or second circuitry 320 may be combined and implemented together in a circuitry without altering the essence of the embodiments.

Figure 4:
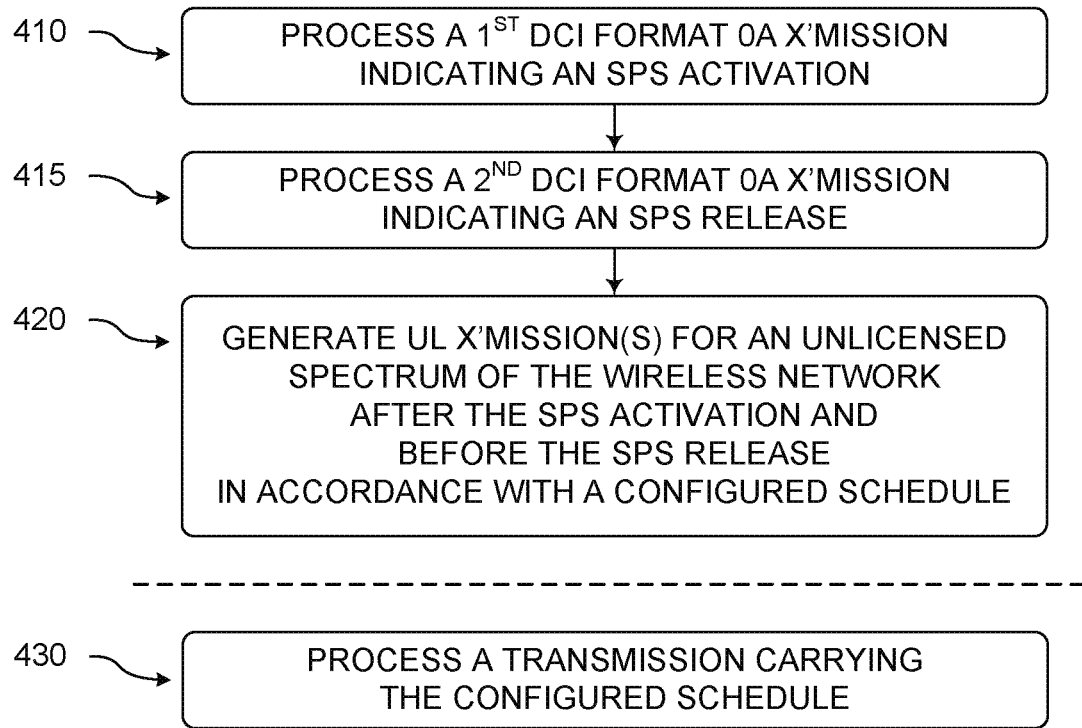
FIGS. 4-5 illustrate methods for a UE for SPS activation and/or SPS release, in accordance with some embodiments of the disclosure.
Figure 5:
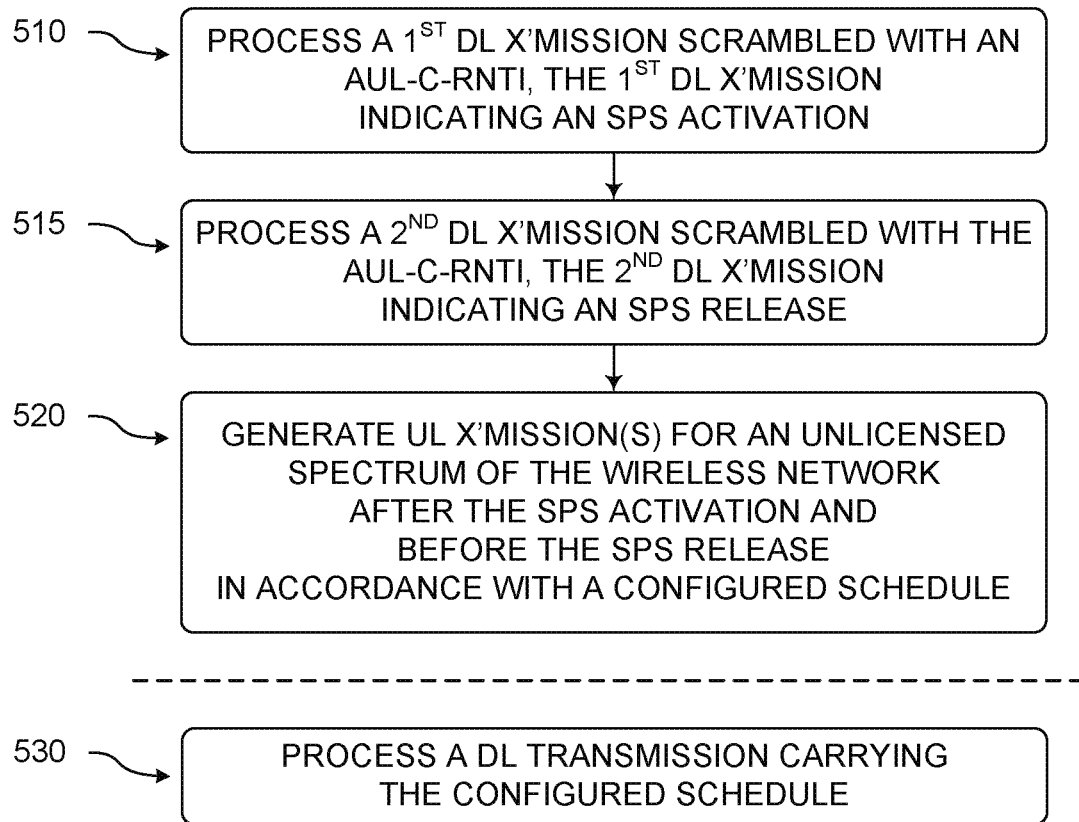

FIGS. 4-5 illustrate methods for a UE for SPS activation and/or SPS release, in accordance with some embodiments of the disclosure. With reference to FIG. 2, methods that may relate to UE 230 and hardware processing circuitry 240 are discussed herein. Although the actions in method 400 of FIG. 4 and method 500 of FIG. 5 are shown in a particular order, the order of the actions can be modified. Thus, the illustrated embodiments can be performed in a different order, and some actions may be performed in parallel. Some of the actions and/or operations listed in FIGS. 4-5 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 230 and/or hardware processing circuitry 240 to perform an operation comprising the methods of FIGS. 4-5. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIGS. 4-5.

Returning to FIG. 4, various methods may be in accordance with the various embodiments discussed herein. A method 400 may comprise a processing 410, a processing 415, and a generating 420. Method 400 may also comprise, for example, a processing 430.

In processing 410, a first DCI format 0A transmission indicating an SPS activation may be processed. In processing 415, a second DCI format 0A transmission indicating an SPS release may be processed. In generating 420, one or more UL transmissions for an unlicensed spectrum of the wireless network may be generated after the SPS activation and before the SPS release in accordance with a configured schedule.

In some embodiments, at least one of the first DCI format 0A transmission and the second DCI format 0A transmission may carry a UE-specific parameter. For some embodiments, at least one of the first DCI format 0A transmission and the second DCI format 0A transmission may be scrambled with an AUL-C-RNTI. In some embodiments, the one or more UL transmissions may comprise at least one of: one or more PUSCH transmissions, or one or more PUCCH transmissions (e.g., ePUCCH transmissions).

In processing 430, a transmission carrying the configured schedule may be processed. In some embodiments, the transmission carrying the configured schedule may be a PDCCH transmission.

For some embodiments, SPS activation may be indicated by one or more fields of the first DCI format 0A transmission having a first set of values, and SPS release may be indicated by one or more fields of the second DCI format 0A transmission having a second set of values. In some embodiments, SPS activation may be indicated by all bits of the one or more fields of the first DCI format 0A transmission being set to a first value, and SPS release may be indicated by all bits of the one or more fields of the second DCI format 0A transmission being set to a second value.

For some embodiments, at least one of the first DCI format 0A transmission and the second DCI format 0A transmission may carry at least one of: a one-bit FF field; a two-bit TPC command field; and a five-bit MCS field. In some embodiments, the first DCI format 0A transmission may carry a two-bit TPC command field having a value of "00" and/or a five-bit MCS field with a most significant bit having a value of "0". For some embodiments, the second DCI format 0A transmission may carry a two-bit TPC command field having a value of "00" and/or a five-bit MCS field having a value of "11111".

Returning to FIG. 5, various methods may be in accordance with the various embodiments discussed herein. A method 500 may comprise a processing 510, a processing 515, and a generating 520. Method 500 may also comprise, for example, a processing 530.

In processing 510, a first DL transmission scrambled with an AUL-C-RNTI may be processed, the first DL transmission indicating a SPS activation. In processing 515, a second DL transmission scrambled with the AUL-C-RNTI may be processed, the second DL transmission indicating an SPS release. In generating 520, one or more UL transmissions for an unlicensed spectrum of the wireless network may be generated after the SPS activation and before the SPS release in accordance with a configured schedule.

In some embodiments, at least one of the first DL transmission and the second DL transmission may carry a UE-specific parameter. For some embodiments, the one or more UL transmissions may comprise at least one of: one or more PUSCH transmissions, or one or more PUCCH transmissions (e.g., ePUCCH transmissions).

For some embodiments, in processing 530, a DL transmission carrying the configured schedule may be processed. In some embodiments, the DL transmission may carry the configured schedule is a PDCCH transmission.

For some embodiments, the first DL transmission is a first DCI format 0A transmission, and the second DL transmission is a second DCI format 0A transmission. In some embodiments, SPS activation may be indicated by one or more fields of the first DCI format 0A transmission having a first set of values, and SPS release may be indicated by one or more fields of the second DCI format 0A transmission having a second set of values. For some embodiments, SPS activation may be indicated by all bits of one or more fields of the first DCI format 0A transmission being set to a first value, and SPS release may be indicated by all bits of one or more fields of the second DCI format 0A transmission being set to a second value.

Figure 6:
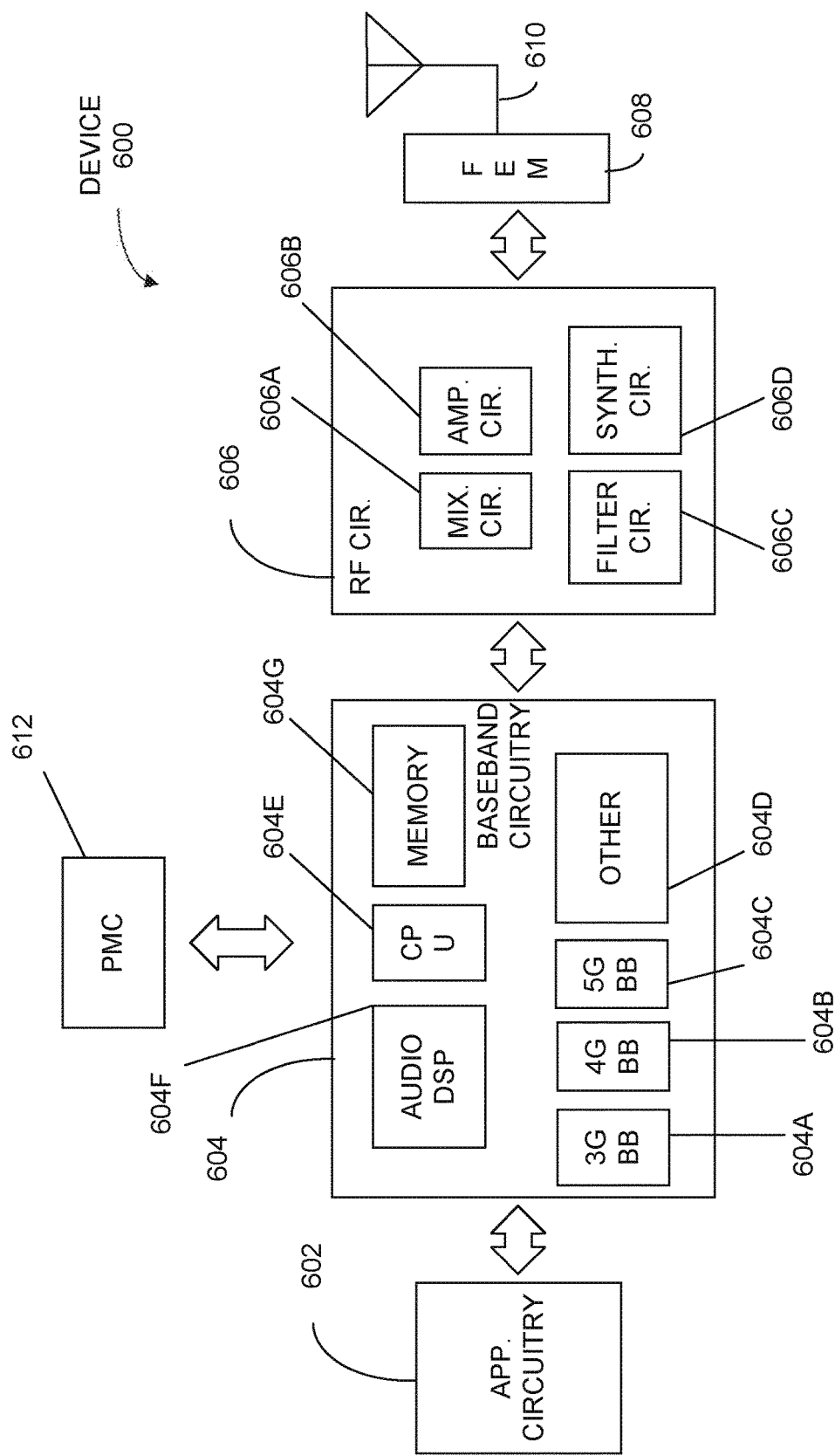
FIG. 6 illustrates example components of a device, in accordance with some embodiments of the disclosure.

FIG. 6 illustrates example components of a device, in accordance with some embodiments of the disclosure. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), and so on). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, and so on. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, and so on to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606A, amplifier circuitry 606B and filter circuitry 606C. In some embodiments, the transmit signal path of the RF circuitry 606 may include filter circuitry 606C and mixer circuitry 606A. RF circuitry 606 may also include synthesizer circuitry 606D for synthesizing a frequency for use by the mixer circuitry 606A of the receive signal path and the transmit signal path. In some embodiments, the mixer circuitry 606A of the receive signal path may be configured to down-convert RF signals received from the FEM circuitry 608 based on the synthesized frequency provided by synthesizer circuitry 606D. The amplifier circuitry 606B may be configured to amplify the down-converted signals and the filter circuitry 606C may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606A of the receive signal path may comprise passive mixers, although the scope of the embodiments is not limited in this respect.

In some embodiments, the mixer circuitry 606A of the transmit signal path may be configured to up-convert input baseband signals based on the synthesized frequency provided by the synthesizer circuitry 606D to generate RF output signals for the FEM circuitry 608. The baseband signals may be provided by the baseband circuitry 604 and may be filtered by filter circuitry 606C.

In some embodiments, the mixer circuitry 606A of the receive signal path and the mixer circuitry 606A of the transmit signal path may include two or more mixers and may be arranged for quadrature downconversion and upconversion, respectively. In some embodiments, the mixer circuitry 606A of the receive signal path and the mixer circuitry 606A of the transmit signal path may include two or more mixers and may be arranged for image rejection (e.g., Hartley image rejection). In some embodiments, the mixer circuitry 606A of the receive signal path and the mixer circuitry 606A may be arranged for direct downconversion and direct upconversion, respectively. In some embodiments, the mixer circuitry 606A of the receive signal path and the mixer circuitry 606A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606D may be a fractional-N synthesizer or a fractional N/N+1 synthesizer, although the scope of the embodiments is not limited in this respect as other types of frequency synthesizers may be suitable. For example, synthesizer circuitry 606D may be a delta-sigma synthesizer, a frequency multiplier, or a synthesizer comprising a phase-locked loop with a frequency divider.

The synthesizer circuitry 606D may be configured to synthesize an output frequency for use by the mixer circuitry 606A of the RF circuitry 606 based on a frequency input and a divider control input. In some embodiments, the synthesizer circuitry 606D may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606D of the RF circuitry 606 may include a divider, a delay-locked loop 'L'), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, and so on. The device 600 goes into a very low power state and it performs paging where again it periodically wakes up to listen to the network and then powers down again. The device 600 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
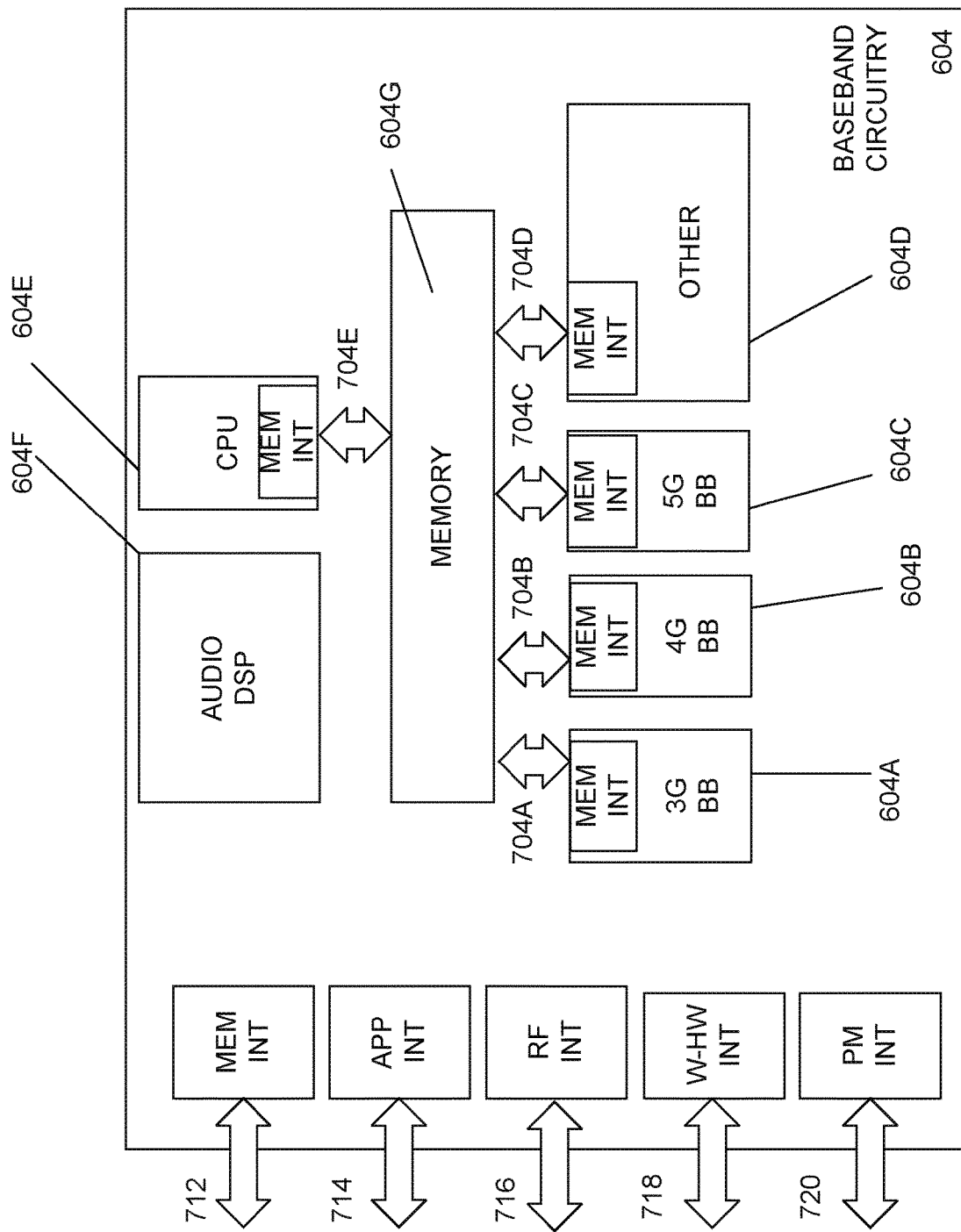
FIG. 7 illustrates example interfaces of baseband circuitry, in accordance with some embodiments of the disclosure.

FIG. 7 illustrates example interfaces of baseband circuitry, in accordance with some embodiments of the disclosure. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with an Evolved Node B (eNB) on a wireless network, comprising: one or more processors to: process a first Downlink Control Information (DCI) format 0A transmission indicating a semi-persistent scheduling (SPS) activation; process a second DCI format 0A transmission indicating an SPS release; and generate one or more Uplink (UL) transmissions for an unlicensed spectrum of the wireless network after the SPS activation and before the SPS release in accordance with a configured schedule, and an interface for sending UL transmissions to a transmission circuitry and for receiving DCI format 0A transmissions from a receiving circuitry.

In example 2, the apparatus of example 1, wherein at least one of the first DCI format 0A transmission and the second DCI format 0A transmission carries a UE-specific parameter.

In example 3, the apparatus of any of examples 1 through 2, wherein at least one of the first DCI format 0A transmission and the second DCI format 0A transmission is scrambled with an Autonomous Uplink Cell Radio Network Temporary Identifier (AUL-C-RNTI).

In example 4, the apparatus of any of examples 1 through 3, wherein the one or more UL transmissions comprise at least one of: one or more Physical Uplink Shared Channel (PUSCH) transmissions, or one or more Physical Uplink Control Channel (PUCCH) transmissions.

In example 5, the apparatus of any of examples 1 through 4, wherein the one or more processors are to: process a transmission carrying the configured schedule.

In example 6, the apparatus of example 5, wherein the transmission carrying the configured schedule is a Physical Downlink Control Channel (PDCCH) transmission.

In example 7, the apparatus of any of examples 1 through 6, wherein SPS activation is indicated by one or more fields of the first DCI format 0A transmission having a first set of values; and wherein SPS release is indicated by one or more fields of the second DCI format 0A transmission having a second set of values.

In example 8, the apparatus of example 7, wherein SPS activation is indicated by all bits of the one or more fields of the first DCI format 0A transmission being set to a first value; and wherein SPS release is indicated by all bits of the one or more fields of the second DCI format 0A transmission being set to a second value.

In example 9, the apparatus of any of examples 1 through 8, wherein at least one of the first DCI format 0A transmission and the second DCI format 0A transmission carries at least one of: a one-bit Format Flag (FF) field; a two-bit Transmit Power Control (TPC) command field; and a five-bit Modulation and Coding Scheme (MCS) field.

In example 10, the apparatus of example 9, wherein the first DCI format 0A transmission carries a two-bit TPC command field having a value of "00"; and wherein the first DCI format 0A transmission carries a five-bit MCS field with a most significant bit having a value of "0".

In example 11, the apparatus of example 9, wherein the second DCI format 0A transmission carries a two-bit TPC command field having a value of "00"; and wherein the second DCI format 0A transmission carries a five-bit MCS field having a value of "11111".

Example 12 provides a User Equipment (UE) device comprising an application processor, a memory, one or more antennas, a wireless interface for allowing the application processor to communicate with another device, and a touch-screen display, the UE device including the apparatus of any of examples 1 through 8.

Example 13 provides machine readable storage media having machine executable instructions that, when executed, cause one or more processors of a User Equipment (UE) operable to communicate with an Evolved Node-B (eNB) on a wireless network to perform an operation comprising: process a first Downlink Control Information (DCI) format 0A transmission indicating a semi-persistent scheduling (SPS) activation; process a second DCI format 0A transmission indicating an SPS release; and generate one or more Uplink (UL) transmissions for an unlicensed spectrum of the wireless network after the SPS activation and before the SPS release in accordance with a configured schedule.

In example 14, the machine readable storage media of example 13, wherein at least one of the first DCI format 0A transmission and the second DCI format 0A transmission carries a UE-specific parameter.

In example 15, the machine readable storage media of any of examples 13 through 14, wherein at least one of the first DCI format 0A transmission and the second DCI format 0A transmission is scrambled with an Autonomous Uplink Cell Radio Network Temporary Identifier (AUL-C-RNTI).

In example 16, the machine readable storage media of any of examples 13 through 15, wherein the one or more UL transmissions comprise at least one of: one or more Physical Uplink Shared Channel (PUSCH) transmissions, or one or more Physical Uplink Control Channel (PUCCH) transmissions.

In example 17, the machine readable storage media of any of examples 13 through 16, the operation comprising: process a transmission carrying the configured schedule.

In example 18, the machine readable storage media of example 17, wherein the transmission carrying the configured schedule is a Physical Downlink Control Channel (PDCCH) transmission.

In example 19, the machine readable storage media of any of examples 13 through 18, wherein SPS activation is indicated by one or more fields of the first DCI format 0A transmission having a first set of values; and wherein SPS release is indicated by one or more fields of the second DCI format 0A transmission having a second set of values.

In example 20, the machine readable storage media of example 19, wherein SPS activation is indicated by all bits of the one or more fields of the first DCI format 0A transmission being set to a first value; and wherein SPS release is indicated by all bits of the one or more fields of the second DCI format 0A transmission being set to a second value.

In example 21, the apparatus of any of examples 13 through 20, wherein at least one of the first DCI format 0A transmission and the second DCI format 0A transmission carries at least one of: a one-bit Format Flag (FF) field; a two-bit Transmit Power Control (TPC) command field; and a five-bit Modulation and Coding Scheme (MCS) field.

In example 22, the apparatus of example 21, wherein the first DCI format 0A transmission carries a two-bit TPC command field having a value of "00"; and wherein the first DCI format 0A transmission carries a five-bit MCS field with a most significant bit having a value of "0".

In example 23, the apparatus of example 21, wherein the second DCI format 0A transmission carries a two-bit TPC command field having a value of "00"; and wherein the second DCI format 0A transmission carries a five-bit MCS field having a value of "11111".

Example 24 provides an apparatus of a User Equipment (UE) operable to communicate with an Evolved Node B (eNB) on a wireless network, comprising: one or more processors to: process a first Downlink (DL) transmission scrambled with an Autonomous Uplink Cell Radio Network Temporary Identifier (AUL-C-RNTI), the first DL transmission indicating a semi-persistent scheduling (SPS) activation; process a second DL transmission scrambled with the AUL-C-RNTI, the second DL transmission indicating an SPS release; and generate one or more Uplink (UL) transmissions for an unlicensed spectrum of the wireless network after the SPS activation and before the SPS release in accordance with a configured schedule, and an interface for sending UL transmissions to a transmission circuitry and for receiving DL transmissions from a receiving circuitry.

In example 25, the apparatus of example 24, wherein at least one of the first DL transmission and the second DL transmission carries a UE-specific parameter.

In example 26, the apparatus of any of examples 24 through 25, wherein the one or more UL transmissions comprise at least one of: one or more Physical Uplink Shared Channel (PUSCH) transmissions, or one or more Physical Uplink Control Channel (PUCCH) transmissions.

In example 27, the apparatus of any of examples 24 through 26, wherein the one or more processors are to: process a DL transmission carrying the configured schedule.

In example 28, the apparatus of example 27, wherein the DL transmission carrying the configured schedule is a Physical Downlink Control Channel (PDCCH) transmission.

In example 29, the apparatus of any of examples 24 through 28, wherein the first DL transmission is a first Downlink Control Information (DCI) format 0A transmission; and wherein the second DL transmission is a second DCI format 0A transmission.

In example 30, the apparatus of example 29, wherein SPS activation is indicated by one or more fields of the first DCI format 0A transmission having a first set of values; and wherein SPS release is indicated by one or more fields of the second DCI format 0A transmission having a second set of values.

In example 31, the apparatus of example 30, wherein SPS activation is indicated by all bits of one or more fields of the first DCI format 0A transmission being set to a first value; and wherein SPS release is indicated by all bits of one or more fields of the second DCI format 0A transmission being set to a second value.

Example 32 provides machine readable storage media having machine executable instructions that, when executed, cause one or more processors of a User Equipment (UE) operable to communicate with an Evolved Node-B (eNB) on a wireless network to perform an operation comprising: process a first Downlink (DL) transmission scrambled with an Autonomous Uplink Cell Radio Network Temporary Identifier (AUL-C-RNTI), the first DL transmission indicating a semi-persistent scheduling (SPS) activation; process a second DL transmission scrambled with the AUL-C-RNTI, the second DL transmission indicating an SPS release; and generate one or more Uplink (UL) transmissions for an unlicensed spectrum of the wireless network after the SPS activation and before the SPS release in accordance with a configured schedule.

In example 33, the machine readable storage media of example 32, wherein at least one of the first DL transmission and the second DL transmission carries a UE-specific parameter.

In example 34, the machine readable storage media of any of examples 32 through 33, wherein the one or more UL transmissions comprise at least one of: one or more Physical Uplink Shared Channel (PUSCH) transmissions, or one or more Physical Uplink Control Channel (PUCCH) transmissions.

In example 35, the machine readable storage media of any of examples 32 through 34, the operation comprising: process a DL transmission carrying the configured schedule.

In example 36, the machine readable storage media of example 35, wherein the DL transmission carrying the configured schedule is a Physical Downlink Control Channel (PDCCH) transmission.

In example 37, the machine readable storage media of any of examples 32 through 36, wherein the first DL transmission is a first Downlink Control Information (DCI) format 0A transmission; and wherein the second DL transmission is a second DCI format 0A transmission.

In example 38, the machine readable storage media of example 37, wherein SPS activation is indicated by one or more fields of the first DCI format 0A transmission having a first set of values; and wherein SPS release is indicated by one or more fields of the second DCI format 0A transmission having a second set of values.

In example 39, the machine readable storage media of example 38, wherein SPS activation is indicated by all bits of one or more fields of the first DCI format 0A transmission being set to a first value; and wherein SPS release is indicated by all bits of one or more fields of the second DCI format 0A transmission being set to a second value.

In example 40, the apparatus of any of examples 1 through 8, and 24 through 31, wherein the one or more processors comprise a baseband processor.

In example 41, the apparatus of any of examples 1 through 8, and 24 through 31, comprising a memory for storing instructions, the memory being coupled to the one or more processors.

In example 42, the apparatus of any of examples 1 through 8, and 24 through 31, comprising a transceiver circuitry for at least one of: generating transmissions, encoding transmissions, processing transmissions, or decoding transmissions.

In example 43, the apparatus of any of examples 1 through 8, and 24 through 31, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) configured to communicate with a base station on a wireless network, comprising:
   one or more processors configured to:
      process a first Downlink Control Information (DCI) transmission indicating a semi-persistent scheduling (SPS) activation; and
      generate one or more Physical Uplink Shared Channel (PUSCH) transmissions for an unlicensed spectrum of the wireless network after the SPS activation and before an SPS release; and transceiver circuitry configured to transmit the one or more PUSCH transmissions and to receive the first DCI transmission.

2. The UE of claim 1, wherein the one or more processors are further configured to process a second DCI transmission indicating the SPS release.

3. The UE of claim 2, wherein the first DCI transmission or the second DCI transmission has DCI format 0A, DCI format 0B, DCI format 4A, DCI format 4B, or a DCI format dedicated to autonomous uplink (AUL) activation and AUL release implemented by the SPS activation and the SPS release.

4. The UE of claim 2, wherein the first DCI transmission or the second DCI transmission includes an additional indicator related to one or more resources where autonomous uplink (AUL) is performed.

5. The UE of claim 2, wherein the first DCI transmission or the second DCI transmission includes a format flag.

6. The UE of claim 1, wherein the first DCI transmission includes a DCI transmission carrying a UE-specific parameter.

7. The UE of claim 1, wherein the first DCI transmission is scrambled with an Autonomous Uplink Cell Radio Network Temporary Identifier (AUL-C-RNTI).

8. The UE of claim 1, wherein the wireless network supports dual connectivity (DC) based Licensed-Assisted Access (LAA) in the unlicensed spectrum or standalone access in the unlicensed spectrum.

9. A method comprising:
processing, by a User Equipment (UE), a first Downlink Control Information (DCI) transmission indicating a semi-persistent scheduling (SPS) activation;
generating, by the UE, one or more Physical Uplink Shared Channel (PUSCH) transmissions for an unlicensed spectrum of a wireless network after the SPS activation and before an SPS release; and
transmitting, by the UE, the one or more PUSCH transmissions to a base station of the wireless network.

10. The method of claim 9, further comprising:
processing, by the UE, a second DCI transmission indicating the SPS release.

11. The method of claim 10, wherein the first DCI transmission or the second DCI transmission has DCI format 0A, DCI format 0B, DCI format 4A, DCI format 4B, or a DCI format dedicated to autonomous uplink (AUL) activation and AUL release implemented by the SPS activation and the SPS release.

12. The method of claim 9, wherein the first DCI transmission includes a DCI transmission carrying a UE-specific parameter.

13. The method of claim 9, wherein the first DCI transmission is scrambled with an Autonomous Uplink Cell Radio Network Temporary Identifier (AUL-C-RNTI).

14. The method of claim 9, wherein the wireless network supports dual connectivity (DC) based Licensed-Assisted Access (LAA) in the unlicensed spectrum or standalone access in the unlicensed spectrum.

15. A User Equipment (UE) configured to communicate with a base station on a wireless network, comprising:
one or more processors to:
process a first Downlink (DL) transmission scrambled with an Autonomous Uplink Cell Radio Network Temporary Identifier (AUL-C-RNTI), the first DL transmission indicating a semi-persistent scheduling (SPS) activation;
generate one or more Uplink (UL) transmissions for an unlicensed spectrum of the wireless network after the SPS activation and before an SPS release; and
an interface for sending the one or more UL transmissions to a transmission circuitry and for receiving the first DL transmission from a receiving circuitry.

16. The UE of claim 15, wherein the one or more processors are further configured to process a second DL transmission scrambled with the AUL-C-RNTI, the second DL transmission indicating the SPS release.

17. The UE of claim 16, wherein at least one of the first DL transmission and the second DL transmission carries a UE-specific parameter.

18. The UE of claim 16, wherein the first DCI transmission or the second DCI transmission includes an additional indicator related to one or more resources where autonomous uplink (AUL) is performed.

19. The UE of claim 16, wherein the first DCI transmission or the second DCI transmission includes a format flag.

20. The UE of claim 15, wherein the wireless network supports dual connectivity (DC) based Licensed-Assisted Access (LAA) in the unlicensed spectrum or standalone access in the unlicensed spectrum.

* * * * *